T. A. ERRETT.
OXYACETYLENE CUTTING AND WELDING TORCH.
APPLICATION FILED AUG. 7, 1918.
1,335,569.
Patented Mar. 30, 1920.
2 SHEETS—SHEET 1.
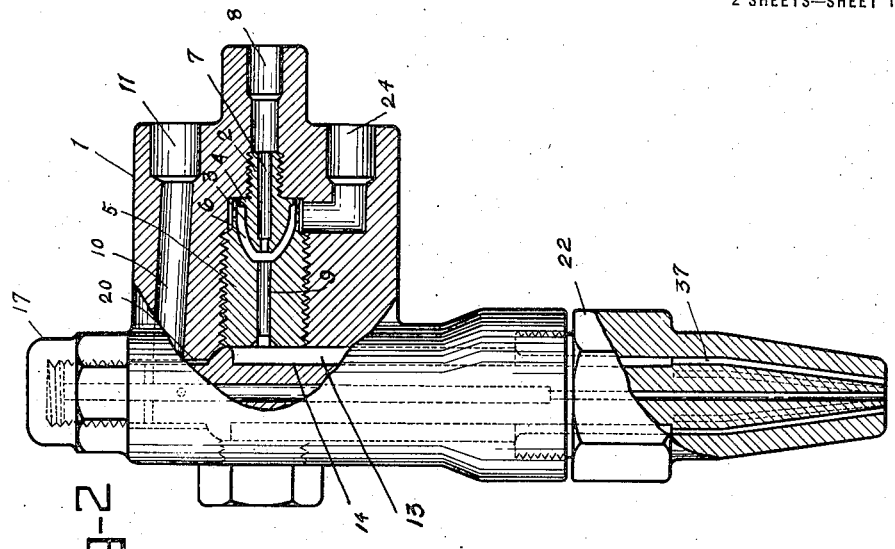
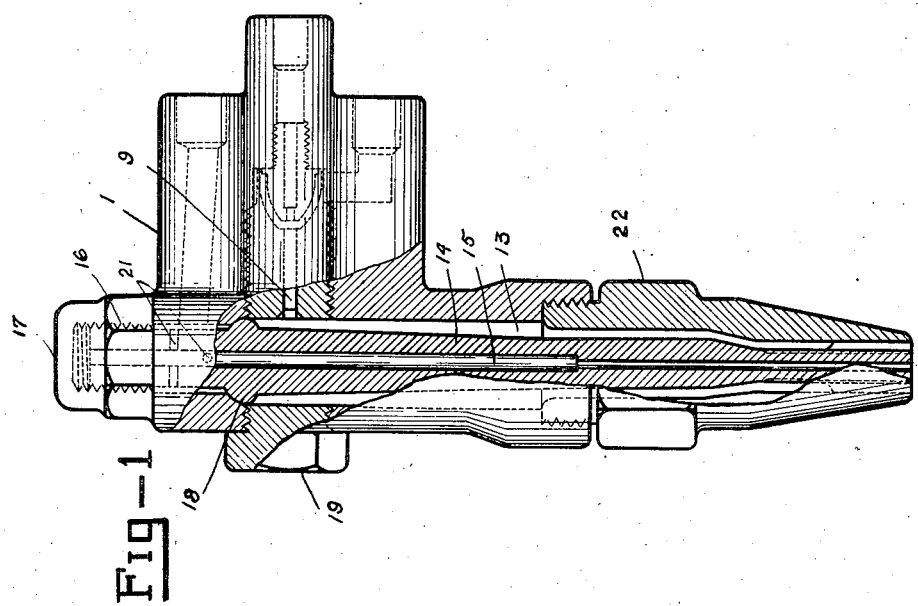
INVENTOR
Thomas A Errett
BY
Richard J Cook
ATTORNEY T. A. ERRETT.
OXYACETYLENE CUTTING AND WELDING TORCH.
APPLICATION FILED AUG. 7, 1918.
1,335,569.
Patented Mar. 30, 1920.
2 SHEETS—SHEET 2.
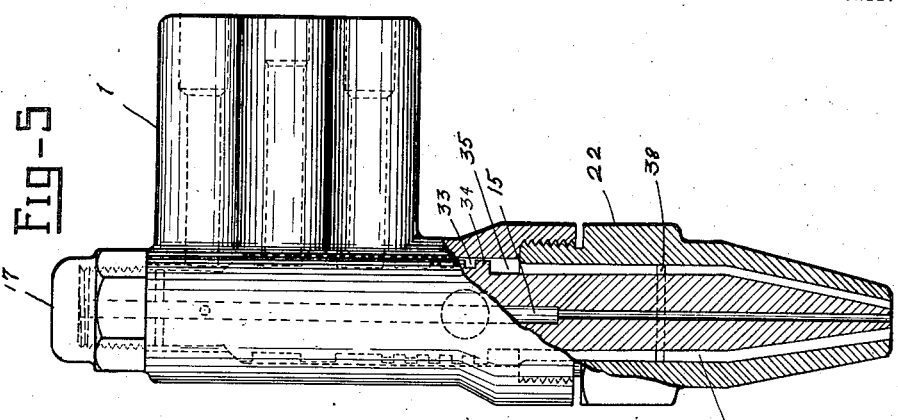
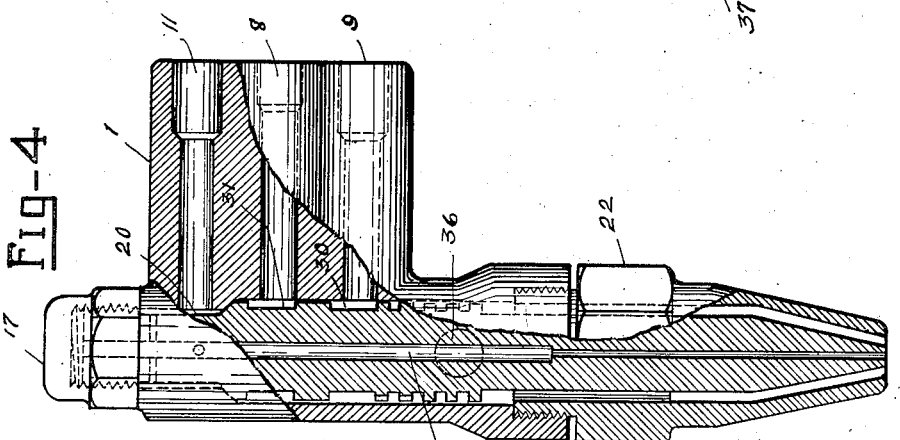
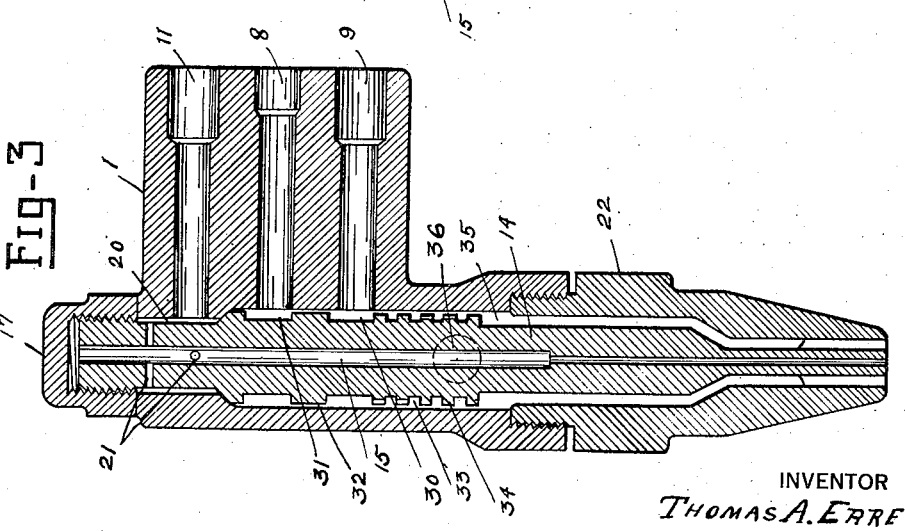
INVENTOR
*Thomas A. Errett*
BY
*Richard J. Cook*
ATTORNEY

UNITED STATES PATENT OFFICE.

THOMAS A. ERRETT, OF SEATTLE, WASHINGTON, ASSIGNOR, BY MESNE ASSIGNMENTS, TO MODERN TORCH CO. INC., A CORPORATION OF WASHINGTON.

OXYACETYLENE CUTTING AND WELDING TORCH.

1,335,569. Specification of Letters Patent. Patented Mar. 30, 1920.

Application filed August 7, 1918. Serial No. 248,817.

*To all whom it may concern:*

Be it known that I, THOMAS A. ERRETT, a citizen of the United States, residing at Seattle, in the county of King and State of Washington, have invented a new and useful Improvement in Oxyacetylene Cutting and Welding Torches, of which the following is a specification.

This invention relates to new and useful improvements in oxyacetylene or oxyhydrogen cutting and welding torches in which oxygen or acetylene gas or oxygen or hydrogen gases are intimately mixed to form a circular preheating flame in the center whereby the preheating flame will always be in advance of the cutting jet regardless of the position or movement of the torch.

This invention is in the nature of an improvement in oxyacetylene cutting and welding torches for which I obtained Letters Patent of the United States, of date October 23, 1917, the differentiations between the two constructions residing largely in the means whereby the gases may be more intimately mixed during their passage through the tip, thereby preventing back firing, resulting in the flame working back through the gas passages of the torch, and which causes the flame to break and damaging the head and causing dangerous explosions.

A further object resides in the provision of a chamber in which the gases are injected and intimately mixed before passing into the annular chamber around the torch.

A further object resides in the construction of the injection type of torch wherein leakage of the high pressure gas into the mixing chamber of the low pressure gases is precluded.

A still further object resides in the construction of this type of torch, making the workable parts thereof accessible to quick disassembly without having to dismantle the torch practically in its entirety.

A still further object and essential feature of the invention consists of a torch that is adapted to have attached thereto interchangeable tips, rendering the torch susceptible to the utilization of various mixtures of gases that have been found more applicable for certain classes of work.

A final object of the invention consists in the provision of a torch so constructed that the shoulder that constitutes the divisible means between the high and the low pressure gases is prevented from over-heating by the provision of means for causing cold oxygen gas to blow upon the top end of the shoulder, keeping the temperature below the ignition point, and in the provision of means for causing the oxy-acetylene gas to pass from the mixing chamber through very small annular recesses connected together in staggered relation by conically shaped depressions for creating whirls and eddy currents, and whereby, in the event of flarebacks, minute explosions will occur at the first intersection of flutes and recesses, causing a local high pressure which will extinguish the flame.

The invention consists in the novel arrangement, construction and combination of parts, as will be more fully described in the following specification, illustrated in the accompanying drawings, and finally pointed out in the appended claims.

In the drawings, Figure 1 is a side elevation in part section of the jet and tip of the injector type of torch; Fig. 2 is an elevation of the same, showing the injector chamber into which the gases are intimately mixed, and an alternative tip in section as can be applied thereto; Fig. 3 is a sectional elevation of the balance pressure type of torch; and Figs. 4 and 5 are elevations of the same in part section, showing the application of alternative tips that can be applied thereto for effecting more advantageous results with certain of the gas mixtures that can be employed.

Referring more particularly to the drawings, in which like reference numerals indicate like parts, the numeral 1 constitutes the shank or handle end of the casing wherein is embodied the passageways for the respective pipes through which the separate gases are conveyed from the intake valve (not shown). Insertible into the shank 1 is a screw threaded plug 2 having a conically shaped head 3 with shoulder 4 that abuts against the rear inner wall of the shank when the plug is screwed up tightly.

In juxtapositon to the conically shaped head 3 of the plug is the end of the screw threaded plug 5 formed with a socket to conform in contour with the head of the plug 2. This socket is of increased size to afford an annular passageway 6 for the gases that are injected therein. Longitudinally extended through the plug 2 is a passageway 7 which connects with a pipe 8 at one end and is in alinement with the orifice of the passageway 9 at the other end, the passageway 9 being longitudinally extended through the screw threaded plug 5 and communicating with an annular chamber 13.

10 is a passageway extending longitudinally through the upper end of the shank 1 and communicates with the port of the pipe 11 through which high pressure oxygen is injected.

Acetylene or hydrogen gas is introduced through the pipe 24 and passes through apertures (not shown) provided in the socket end of the screw threaded plug 5, as at 12, where it expands into the annular passageway 6 and from there passes through the orifice of the passageway 9 into an annular space 13 formed between the outer casing of the torch and the insertibly disposed torch member 14.

The torch, as shown in Fig. 1, consists of an elongated cylindrically shaped member with a channel 15 extending longitudinally through the center thereof. The lower end of the torch is of reduced diameter, its outer periphery preserving the same parallelism as the peripheral surface of the portion above.

Upon the upper end of the torch is provided interior or exterior threads 16 for the reception of the screw cap 17, and below these threads upon the outer periphery of the torch is provided a shoulder 18 that is adapted to abut against the projecting inner wall of the upper casing 14 formed by the decreased diameter of the bore thereof. When the cap 17 is tightened upon the threads, the shoulder 18 is caused to abut against the projection of the casing's inner wall and form a tight joint against leakage of gases from the high pressure into the low pressure mixing chambers or vice versa.

Very frequently it becomes necessary to dismantle the torch for purposes of repair. To facilitate accessibility to the working parts of the invention as herein described, without having to practically take the torch apart in its entirety, a screw cap 19 is provided in the casing 14 in alinement with the plug 5 of the shank 1; the location of the screw cap 19 in this position enables the operator to remove the plug 5 after the torch member 14 has been removed, thence access to the conically-shaped headed plug 2 can be had for its removal, thereby removing all workable parts from the shank for inspection, cleaning or repair.

Oxygen is applied to the acetylene flame from the oxygen pipe 8 being injected into the premixing annular passageway 6 where it intimately mixes with the acetylene as it passes outwardly through the orifice of the passageway 9 into the annular mixing chamber 14 and outwardly through the port at the end of the torch.

High pressure oxygen is injected through the pipe 11 into the passageway 10 from whence it passes into the annular chamber 20 and thence into the center channel 15 of the torch through orifices 21 and thence outwardly through the port at the lower end of the torch member 14.

It will be understood in all cases that acetylene, or what is commonly known as city gas, may be used in combination with oxygen to form a preheating or welding flame. The interchangeable tips, as shown in Figs. 1 and 2, have bores that conform in contour with the outer peripheral surface of the lower extremity of the torch member 14. As shown in Fig. 2, the lower end of the torch member 14 is of increased diameter and tapers toward its lower extremity. A plurality of longitudinal flutes 37 are disposed around the lower peripheral surface of the lower extremity through which the gases from the premixing annular chamber 13 pass outwardly to the atmosphere.

In Figs. 3, 4 and 5 is shown the balance pressure design of torch wherein the gases are intimately mixed in the annular chamber formed by the outer periphery of the torch member 14 and the interior bore of the casing into which the torch member 14 is projected.

The acetylene or hydrogen gas is introduced through the pipe 9 into the annular chamber 13 formed by a depression provided on the outer peripheral surface of the torch 14. The oxygen being similarly introduced through pipe 8 into an annular chamber 31 provided upon the outer peripheral surface of the torch 14 in like manner. The shoulder 32 formed intermediate the two chambers terminates short of abutment with the wall of the shank 1, thereby providing an interconnecting passageway between the two chambers for the circulation of the two gases, where they become intimately mixed and are thence precipitated into the chambers 33 provided by a plurality of annular depressions formed in the peripheral surface of a collar 34 provided on the torch member. The gases pass from one chamber to another through a plurality of circular concavities disposed in staggered relation within the chambered collar and these concavities project down slightly within the peripheral surface of the torch. The result is, that as the gases circulate through these chambers into these concavities, whirls and eddy currents are set up which produce a perfectly mixed gas of the highest efficiency. An annular expansion chamber 35 is provided on the torch stem into which the gases are received after leaving the chambers 33. The gases passing from this chamber outwardly through a plurality of longitudinal flutes 37 provided in the enlarged peripheral surface of the torch member's lower end, which recede in diameter as the end of the torch is approached.

An annular chamber 38 is provided around the fluted end of the torch's peripheral surface, as shown in Fig. 5, for affording means for mixing the gases more intimately before being expelled to the atmosphere. The provision of this channel being of utility in the application of city gas.

In Figs. 3 and 4, the shape of the lower peripheral surface of the torch, around which the respective tips 22, conforming in contour therewith, are of corresponding construction as shown in Figs. 1 and 2.

Having thus described my invention, what I claim as new and desire to protect by Letters Patent, is:—

1. A cutting and welding torch of the class described comprising a hollow casing having a shank formed integral therewith, a conically shaped mixing chamber provided within said shank, a port for acetylene or hydrogen gas communicating with said chamber, a port for low pressure oxygen communicating with said chamber, a passageway leading from said chamber to said hollow casing, a passageway for high pressure oxygen in communication with said hollow casing, a torch member insertible through said casing having a shoulder adapted to abut against the reduced annular bore of the upper end thereof and form an annular chamber above and below said shoulder for high and low pressure gases respectively, a channel extending through the center of said torch member having orifice communications with the chamber above said shoulder, a cap for closing the upper end of said channel and for sustaining said shoulder in abutment with the peripheral wall of the reduced annular bore of the upper end of said casing, whereby acetylene or hydrogen and low pressure oxygen gases injected from the conically shaped mixing chamber into the annular chamber below said shoulder are precluded from intermixing with the high pressure oxygen in the annular chamber above said shoulder, and means provided in said casing in alinement with said conically shaped mixing chamber for facilitating easy access thereto.

2. A cutting and welding torch of the class described comprising a hollow casing having a shank formed integral therewith provided with a plurality of passageways for the introduction of acetylene or hydrogen and low pressure oxygen gases into said hollow casing, a torch member having a channel through the center thereof, said torch member insertible through said hollow casing and having a shoulder adapted to abut against the reduced annular bore of the upper end thereof for separating the low and high pressure gases, a cap for maintaining said shoulder in abutment with the reduced annular bore of said casing, an annular depression provided upon the upper end of said torch member above said shoulder and registerable with said channel, a plurality of annular depressions provided on said member below said shoulder adjacent the acetylene and oxygen ports respectively, a series of small annular depressions provided on said member having connecting means for the circulation of the low pressure gases therethrough, an annular expansion chamber registerable with said smaller annular depressions, and fluted means registerable with said expansion chamber provided on the lower extremity of said member whereby gases are expelled to the atmosphere in finely divided jets.

Signed by me at Seattle, Washington, this 19th day of July, 1918.

THOMAS A. ERRETT.

Witnesses:
E. B. HERALD,
R. J. COOK.